United States Patent [19]

Booth et al.

[11] Patent Number: 4,505,168

[45] Date of Patent: Mar. 19, 1985

[54] VEHICLE STEERING SYSTEM

[75] Inventors: Stanley H. Booth, Huntington; John C. E. Flint, Stroud, both of England

[73] Assignee: Commercial Hydraulics Gloucester Ltd., Aldwych, England

[21] Appl. No.: 461,226

[22] Filed: Jan. 26, 1983

[30] Foreign Application Priority Data

Jan. 8, 1983 [GB] United Kingdom ............... 8300483

[51] Int. Cl.³ .................... B62D 11/08; B62D 11/10
[52] U.S. Cl. ...................... 74/687; 180/6.44
[58] Field of Search ............. 180/6.44; 74/687, 720.5, 74/665 T

[56] References Cited

U.S. PATENT DOCUMENTS 3,461,744 8/1969 Booth ...................... 74/687

FOREIGN PATENT DOCUMENTS

1078627 8/1967 United Kingdom ............... 180/6.44

Primary Examiner—John A. Pekar
Attorney, Agent, or Firm—Staas & Halsey

[57] ABSTRACT

A steering system for a vehicle having tracks or sets of wheels on opposite sides thereof, comprising a differential drive for the tracks or wheel sets which includes a hydrostatic transmission, and a control which is operative in response to a steering demand to cause the hydraulic transmission to drive the tracks or wheel sets at different relative speeds and thereby steer the vehicle. When the pressure in the hydrostatic transmission rises above a predetermined level during such steering, a brake is automatically actuated to apply a braking effect to the appropriate track or wheel set, thereby supplementing the steering action. The action of the brake is progressive, i.e. it applies an increasing braking effect with increased steering demand.

17 Claims, 7 Drawing Figures

VEHICLE STEERING SYSTEM

This invention relates to a steering system for a vehicle having tracks or sets of wheels on opposite sides thereof, the vehicle being steered by varying the speed of one track or wheel set relative to the speed of the other.

In a particular example of a steering system of this type, each track or wheel set is coupled to a planet carrier of a respective epicyclic gearing, a sun gear and an annular gear of this gearing being coupled respectively to a common mechanical drive parallel with a respective hydrostatic pump/motor, and to a direct mechanical connection. The pumps/motors, which are of variable displacement, form part of a closed hydrostatic transmission circuit and are operatively interlocked by means of a linkage such that an increase in the displacement of one pump/motor will cause a decrease in the displacement of the other.

In steering systems of this type, the direction of rotation of the sunwheels may be the same as that of their respective output shafts or opposite to that of their respective output shafts. While the descriptions that follow are based on the first of these arrangements, the systems would work equally well with the second arrangement.

During normal forward drive, both of the pumps/motors operate at the same displacements so that the tracks or wheel sets are driven at the same speeds. However, when the vehicle is turned to the left or right, the aforementioned linkage is operated to decrease the displacement of the pump/motor coupled to the track or wheel set on the opposite side of the vehicle to the turning direction, thereby increasing the speed of that track or wheel set. At the same time, the displacement of the other pump/motor is increased so as to decrease the speed of its associated track or wheel set. Differential gearing is provided in the common mechanical drive to permit the speeds of the tracks or wheel sets to vary inversely in this manner.

For small radius turns, where the pumps/motors are unable to provide enough steering torque on their own, the steering action is supplemented by applying a braking effect to the gear member (usually a sunwheel) whose speed is to be reduced. More particularly, when the pressure in the hydrostatic transmission exceeds a predetermined value, a valve is actuated to apply the hydraulic fluid to a brake on the appropriate side of the vehicle. However, the steering system tends to be rather unstable under such conditions of operation, because the action of applying the hydraulic fluid to the brake tends to reduce the hydrostatic pressure at the pumps/motors to a level below the aforementioned predetermined value, thereby causing the valve to de-actuate and the brake to be released. The pressure in the hydrostatic transmission will then rise above the predetermined value to actuate the valve once again, and so on. This instability gives rise to significant drawbacks in the operation of the previous steering system.

Another drawback of the system just described is caused by the fact that the pumps/motors are interlocked in their operation so that their displacements cannot be varied except in an inverse manner. This means that the percentage of the capacity of each pump/motor which is available for steering power is limited.

It is an object of the present invention to overcome the above-described drawbacks.

According to the present invention, a steering system for a vehicle having tracks or sets of wheels on opposite sides thereof comprises a differential drive for said tracks or wheel sets which includes a hydrostatic transmission, control means operative in response to a steering demand to cause the hydraulic transmission to drive the tracks or wheel sets at different relative speeds and thereby steer the vehicle, and brake means which when the pressure in the hydrostatic transmission rises above a predetermined level causes a braking effect to be applied to the appropriate side of the system and thereby supplement the steering action, said braking effect increasing progressively with increasing steering demand.

Preferably, the control means includes an input member which is moved in accordance with said steering demand, an output member which moves in response to movement of the input member to cause the hydrostatic transmission to drive the tracks or wheel sets at different speeds, spring means which operatively interconnects the input and output members, and override means applying to the output member in opposition to the spring means a force which is dependent upon the pressure in the hydrostatic transmission, the spring means having a pre-load which is set so as to be overcome by the override means in the event that the pressure in the hydrostatic transmission exceeds a predetermined maximum safe level.

Desirably, the hydrostatic transmission includes a respective variable displacement pump/motor operatively coupled to each track or wheel set, and the control means is operative in response to said steering demand to alter the displacement of an appropriate one of the pumps/motors while maintaining the displacement of the other pump/motor substantially constant. In the absence of any steering demand both pumps/motors can be set to their maximum displacement, with the appropriate one having its displacement reduced in response to said steering demand.

In a particular example of the above, each pump/motor has a control member which is movable to alter its displacement, and the control means includes a linkage which interconnects the control members and which is moved in response to said steering demand, the link occupying a neutral position when there is no steering demand wherein the displacements of both pumps/motors are equal, and being moved in one or the opposite direction when a steering demand is applied to the control unit to alter the displacement of said appropriate one of the pumps/motors. Preferably, the link is connected to the control members by respective pin-and-slot connections.

The brake means may include fluid pressure-operated brakes associated with a hydrostatic transmission and valve means operatively connected between the brakes and a source of pressurised fluid (which is preferably independent of the hydrostatic transmission), the valve means being operated to increase the fluid pressure supplied to the appropriate brake in response to said increasing steering demand. Conveniently, the valve means is responsive to the pressure in the hydrostatic transmission.

The control means may include an input member which is moved in accordance with said steering demand, and means (such as a pressurised fluid obtained from the hydrostatic transmission and passed through at least one pressure-reducing constriction) operative to apply a force to the input member which opposes such movement thereof to a degree dependent upon the pressure in the hydrostatic transmission. In this case, the valve means can include a valve member which is moved in one or the opposite direction from a neutral position to increase the fluid pressure applied to one or the other of said brakes respectively, the valve member and the input member of the control means being pivotally connected to a common link to which said steering demand is applied, preferably by way of an operating member which is pivotally connected to the link at a point intermediate the pivotal connections to the valve and input members.

In a preferred construction of the valve means, the valve member is axially movable within a cylinder to vary the size of one or the other of two constrictions in respective fluid paths from the pressurised fluid source. In one embodiment of such valve means, each constriction is normally open and is provided in a respective fluid path between the pressurised fluid source and drain, and each brake is connected to a point between the source and a respective one of the constrictions. In an alternative embodiment, each constriction is normally closed and is provided in a respective fluid path between the pressurised fluid source and a respective one of the brakes, and the valve means includes two further constrictions whose size can be varied by axial movement of the valve member within the cylinder, each of the further constrictions being provided between a respective one of the brakes and drain, and being normally open but being closed when the valve member moves to open the constriction between the respective brake and the source. Each constriction can be defined between opposed shoulders on the valve member and the cylinder respectively, in which case one of the shoulders (preferably the one on the valve member) can be grooved or notched at spaced points on its periphery.

Alternatively, where the hydrostatic transmission includes a respective hydrostatic pump/motor operatively coupled to each track or wheel set and the two pumps/motors are connected together by hydraulic lines so as to form a closed hydraulic circuit, the valve means can comprise a pair of valves each of which is responsive to the pressure in a respective one of said hydrostatic lines to operate a respective one of said brakes. In this case, each valve can include a valve member which is axially movable within a cylinder to vary the size of a constriction in a fluid path from the pressurised fluid source, and the valve member can be moved in dependence upon the pressure in the hydrostatic transmission to reduce the size of the constriction with increasing pressure. The constriction is preferably of the form mentioned above.

In addition, the valve member can be acted upon in opposite axial directions by a fluid whose pressure is dependent upon the pressure in the hydrostatic transmission and by a spring having a pre-load which can be overcome by said fluid pressure when the pressure in the hydrostatic transmission reaches said predetermined level. This fluid pressure can be obtained by connecting the valve to the hydrostatic transmission through at least one pressure-reducing constriction.

The invention will now be further described, by way of example, with reference to the accompanying drawings, in which.

Figure 1:
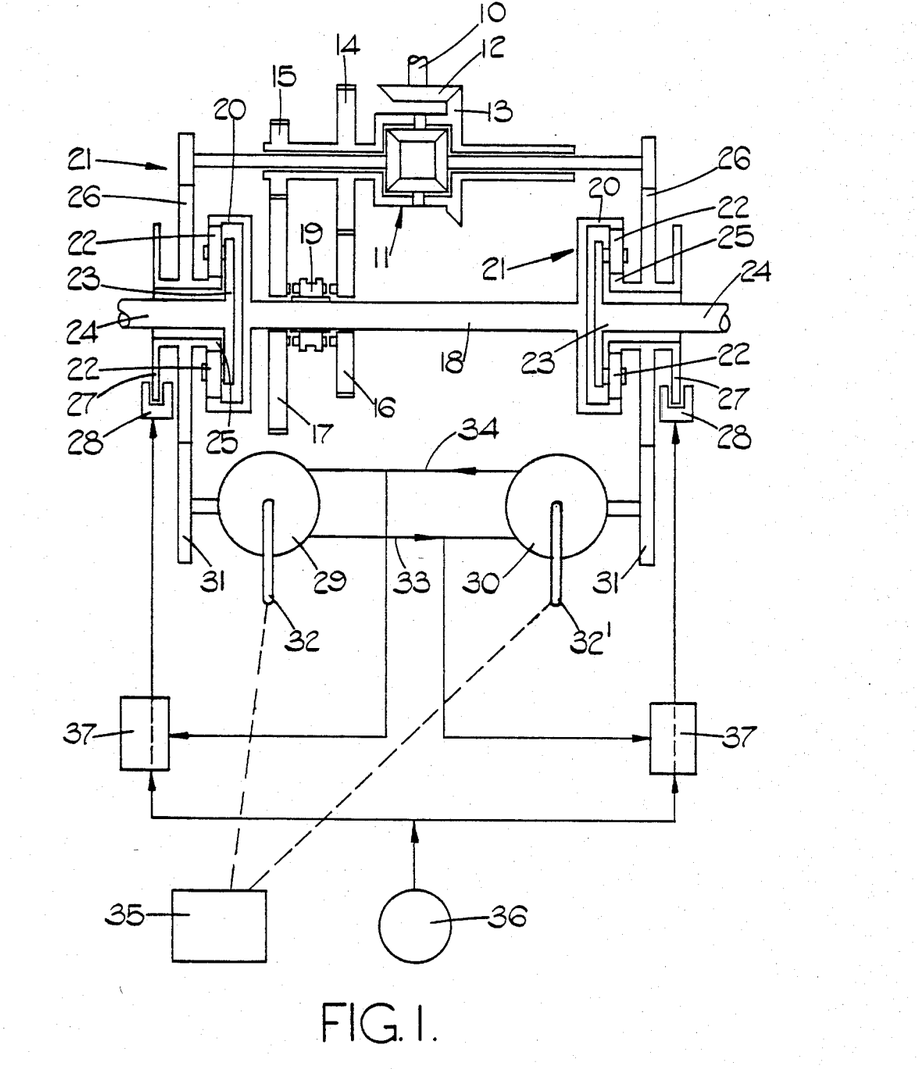
FIG. 1 is a diagram of a first embodiment of a vehicle steering system according to the present invention.

FIG. 1 shows one form of driving and steering system, for mounting in a tracked or wheeled vehicle, comprising an input shaft 10, connected to the vehicle's engine, driving, through bevel gears 12 and 13, a differential casing 11 which carries two gear wheels 14, 15 fixed thereon to drive engaging gear wheels 16, 17 rotatably mounted on a main driving shaft 18 located transversely in the vehicle. A sliding clutch member 19 connects either of the gear wheels 16, 17 to the main driving shaft 18 thus providing alternative gear ratios between the differential casing 11 and the main driving shaft 18. Although only a two ratio gear is shown, any suitable multi-ratio gearing may be used. Located on each side of the vehicle is an epicyclic gearing 21 and the ends of the main driving shaft 18 are respectively connected to the annular gears 20 of such epicyclic gearings 21. The planet carriers 23 of these epicyclic gearings 21 drive the track or wheels (not shown) on the left and right hand side of the vehicle. Drive is also taken from the input shaft 10 through a differential gearing to the sunwheel 25 of both left and right hand epicyclic gearings 21. Two similar variable displacement hydraulic motor/pumps, namely a left and a right hand motor/pump 29, 30 are arranged in the vehicle and are gearably connected to the sun wheel 25 in the left and right hand epicyclic gearing 21 by means of gear wheels 31.

The pumps/motors 29, 30 are of the variable displacement type, and are provided with respective control levers 32 and 32' which can be moved to vary the displacement. The pumps/motors 29 and 30 are hydraulically connected in a closed circuit by hydraulic lines 33 and 34. Although not actually illustrated, an auxiliary hydraulic pump will be provided to replace any hydraulic fluid lost from this circuit. A control unit 35 is provided for controlling the relative displacements of the two pumps/motors 29, 30 in response to a steering demand: the manner in which this unit operates will be described later.

A respective brake 28 co-operates with each of the sun wheels 25, and is actuable by means of fluid pressure derived from a source 36. This source is preferably separate from that which supplies the hydraulic circuit between the pumps/motors 29 and 30. The fluid pressure actually applied to each brake is controlled by a respective valve unit 37 according to the fluid pressure in a respective one of the hydraulic lines 33 and 34. The manner in which the valve units 37 operate will also be described later.

During normal forward travel of the vehicle, the tracks will be driven from the vehicle's engine by way of the drive shaft 10, the differential casing, the change speed gear wheels 14 and 16 or 15 and 17, the shaft 18, the epicyclic gearings 21 and the shafts 24. At this time, the pumps/motors 29 and 30 will be set to the same (perferably maximum) displacement, so that they rotate the sun wheels 25 of the epicyclic gearings 21 at the same speed: hence, the two shafts 24 will rotate at the same speed, applying equal drive to both sides of the vehicle. In order to steer the vehicle to the left, the control unit 35 is operated to make the displacement of the right-hand pump/motor 30 smaller than that of the left-hand pump/motor 29. The sun wheel 25 of the right-hand epicyclic gearing 21 is thereby rotated faster than its counterpart in the left-hand gearing 21, so that the right-hand shaft 24 rotates faster than the left-hand shaft 24. The unequal drive thus applied to the tracks causes the vehicle to turn to the left. Steering to the right is accomplished in an analogous manner, with the control unit 35 being operated to make the displacement of the pump/motor 29 smaller than that of the pump/motor 30. In the case of small radius turns, where the torque required to vary the relative speeds of the two sun wheels 25 exceeds the capacity of the pumps/motors 29 and 30, the steering action is supplemented by applying an appropriate one of the brakes 28, such application occurring automatically when the hydrostatic pressure in one or other of the lines 33 and 34 exceeds a preset level.

Figure 2:
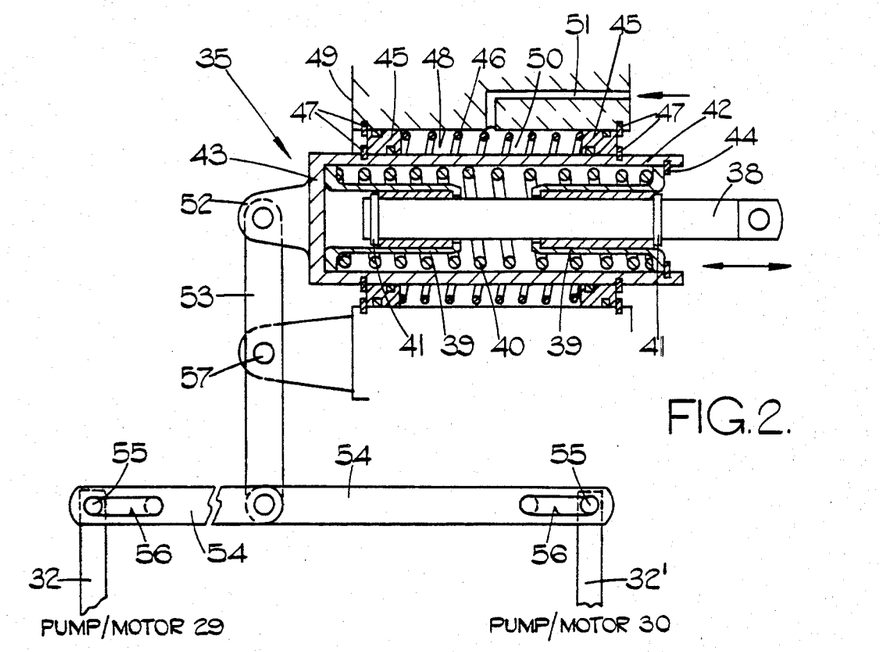
FIG. 2 is a sectional view of a steering control unit which forms part of the system shown in FIG. 1.

The control unit 35 is shown in detail in FIG. 2. Reference numeral 38 denotes an input member which is moved in accordance with the steering demand (rightwards as viewed to steer the vehicle to the left, leftwards to steer the vehicle to the right). A pair of annular abutment members 39 are slidably mounted on the exterior of the input member 38, and under normal conditions of operation are urged by a compression spring 40 therebetween into engagemet with respective stops 41 on the input member 38. The abutment members 39 are slidably housed within a cylinder 42, with one member 39 normally abutting an end wall 43 of the cylinder and the other member 39 normally abutting a stop 44 on the cylinder interior. The cylinder 42 is itself surrounded by two axially spaced, annular pistons 45 having a compression spring 46 interposed therebetween, the spring 46 normally urging the pistons 45 into engagement with respective stops 47. The pistons 45 are in turn slidably housed in a cylindrical chamber 48 in a fixed block 49. An annular space 50 is thus defined between the pistons 45, the exterior of the cylinder 42 and the internal wall of the chamber 48: to this space is supplied fluid at a pressure which is dependent upon the hydrostatic pressure at the pumps/motors 29 and 30, by way of a supply passage 51. This fluid pressure may be derived by connecting the passage 51 to the closed hydraulic circuit of the pumps/motors in such a way that the pressure in the annular space 50 is a set fraction of that in the hydraulic circuit. Alternatively, the pressure may be derived from a separate low-pressure source and may be regulated by a valve in accordance with the pressure in the hydraulic circuit.

A mounting 52 on the end wall 43 of the cylinder 42 provides a pivot point for one end of a lever 53. At its other end, the lever 53 is pivotally coupled to cross-links 54 which interconnect the displacement control levers 32 and 32' of the pumps/motors 29 and 30, each control lever having a pin 55 on its free end which slidably engages in a slot 56 in a respective one of the cross-links 54. In a neutral position of the control unit 35 (as illustrated), the slots 56 just engage the pins 55 with the pumps/motors 29 and 30 set at maximum displacement. A fulcrum for the lever 53 is provided by a fixed pivot 57 on the block 49.

In order to steer the vehicle to the left, the input member 38 is moved rightwards (as mentioned previously). This causes the cylinder 42 to move rightwards also: the spring 40 between the two abutment members 39 is set such that it does not compress at this time. The lever 53 is thus pivoted clockwise about the fulcrum 57, thereby moving the cross-links 54 to the left. During such movement of the cross-links, the control lever 32 of the pump/motor 29 will remain at its maximum displacement position because the pin 55 will slide along the respective slot 56. However, the control lever 32' of the pump/motor 30 will be carried along with the cross-links 54 to reduce the displacement of that pump/motor. Hence, the pump/motor 30 will now run at a faster speed than the pump/motor 29, causing the vehicle to turn to the left in the manner described previously. Steering of the vehicle to the right is performed in an analagous manner, with the control lever 32' of the pump/motor 30 remaining at the maximum displacement position while the control lever 32 of the pump/motor 29 is moved to reduce the displacement.

During the steering operation, movement of the cylinder 42 of the control unit 35 to the left or right will cause one of the annular pistons 45 to move towards the other, thereby compressing the space 50 therebetween. As described previously, the space 50 is supplied with fluid at a pressure which is dependent upon the hydrostatic pressure at the pumps/motors 29 and 30, which will impose a resistance on such movement of the pistons 45. Since the hydrostatic pressure will rise with increased steering demand, the magnitude of this resistance will also rise as the steering demand is increased. Moreover, this resistance will be transmitted through the cylinder 42 to the input member 38 to which the steering demand is applied. Hence, the input member 38 is given a suitable "feel".

The force of the spring 40 between the two annular abutment members 39 is set so as to equal the force applied to the annular pistons 45 by the fluid in the space 50 when the hydrostatic pressure at the pumps/motors 29 and 39 reaches a maximum safe value. Hence, if the hydrostatic pressure exceeds this value during a steering operation, the force of the spring 40 will be overcome and the cylinder 42 will be moved towards its neutral position under the action of the fluid in the space 50. This will in turn cause the cross-links 54 to be moved back towards their neutral position, thereby increasing the displacement of the pump/motor 29 or 30 whose speed had previously been increased, until the hydrostatic pressure has returned to a safe level.

As mentioned previously, when the torque required to steer the vehicle exceeds the capacity of the pumps/motors 29 and 30, the steering action is supplemented by applying an appropriate one of the brakes 28, such application being performed automatically by means of the valve units 37. One of the valve units 37 is shown in detail in FIG. 3, the other unit being identical thereto. Each unit includes a spool 57 which has axial steps 58 and 59 therein, the spool being slidably received in a configurated cylinder 60. The axial step 58 defines a shoulder against which acts fluid at a pressure dependent upon the hydrostatic pressure at the pumps/motors 29 and 30, this fluid being supplied to the cylinder 60 by way of a passage 61. Preferably, the same fluid pressure is employed as is supplied to the space 50 in the control unit 35. The axial step 59 is grooved at localised points 62 on its periphery, and co-operates with a facing step 63 on the cylinder side wall to define a variable constriction. Fluid from the source 36 (see FIG. 1) is supplied by way of a passage 64 to one side of the variable constriction, the other side of the constriction being connected to drain by way of a passage 65. A branch line 66 from the passage 64 is connected to the respective brake 28 (not shown in FIG. 3): the pressure of fluid in this line acts on the spool in opposition to the fluid in passage 61.

A compression spring 67 normally urges the spool 57 into a position wherein the steps 59 and 63 present substantially no resistance to fluid flow therebetween. Hence, as long as the force applied to the spool 57 by the fluid from passage 61 is below the force of the spring 67, the fluid pressure in line 66 will be insufficient to actuate the brake 28. When, however, the hydrostatic pressure in either of the hydraulic lines 33 and 34 (FIG. 1) exceeds a preset level, the pressure of the fluid in the passage 61 of the appropriate valve unit 37 will be sufficient to overcome the force of the spring 67, thereby moving the spool 57 to the right, as viewed in FIG. 3. This will in turn cause the steps 59 and 63 to restrict the flow of fluid from the passage 64 to drain, so that the pressure of the fluid in the passage 64 (and hence in the line 66) will increase, eventually to a level which is sufficient to actuate the appropriate brake 28.

Figure 3:
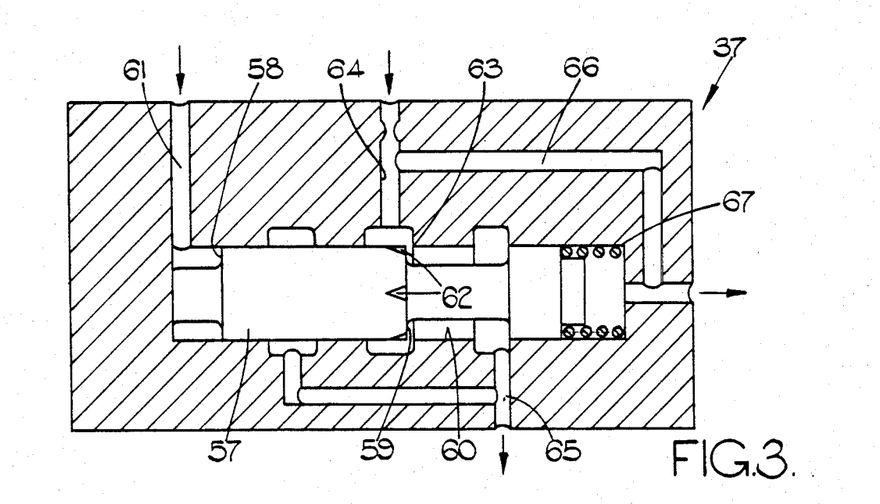
FIG. 3 is a sectional view of a brake control valve which also forms part of the system shown in FIG. 1.

Because the step 59 in the spool 57 is provided with grooves 62, the flow restriction imposed by the steps 59 and 63 will increase progressively as the spool moves further to the right, reaching a maximum when the grooves 62 pass fully under the step 63. Consequently, the force applied by the brake 28 will also increase progressively as the hydrostatic pressure in the line 33 or 34 rises with increasing steering demand. The increased braking action will in turn mitigate the rise in the hydrostatic pressure, resulting in the steering system being very stable in operation. This is to be contrasted with the previous arrangement described above, wherein the brakes act on a simple on/off principle and thereby give rise to instability.

Figure 4:
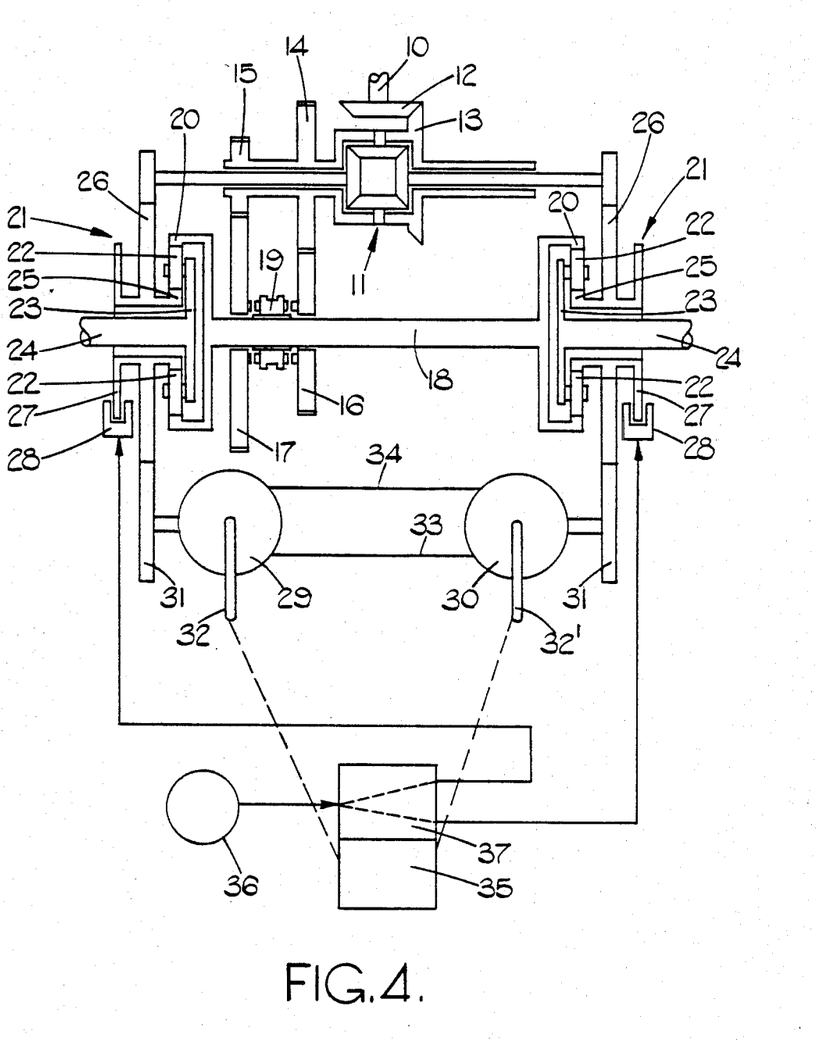
FIG. 4 is a diagram of a second embodiment of a vehicle steering system according to the present invention.
Figure 5:
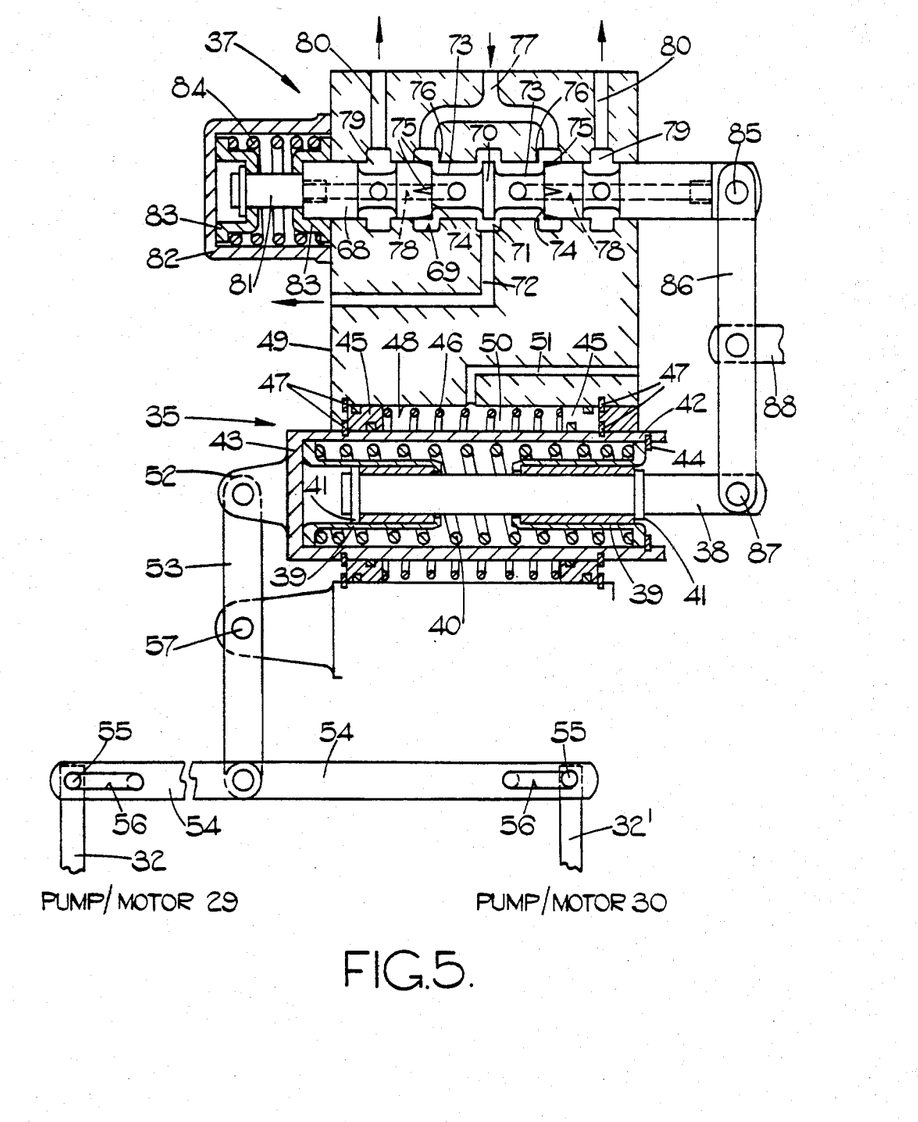
FIG. 5 is a sectional view of a steering and brake control unit which forms part of the system shown in FIG. 4, the control unit being illustrated in a neutral position.
Figure 6:
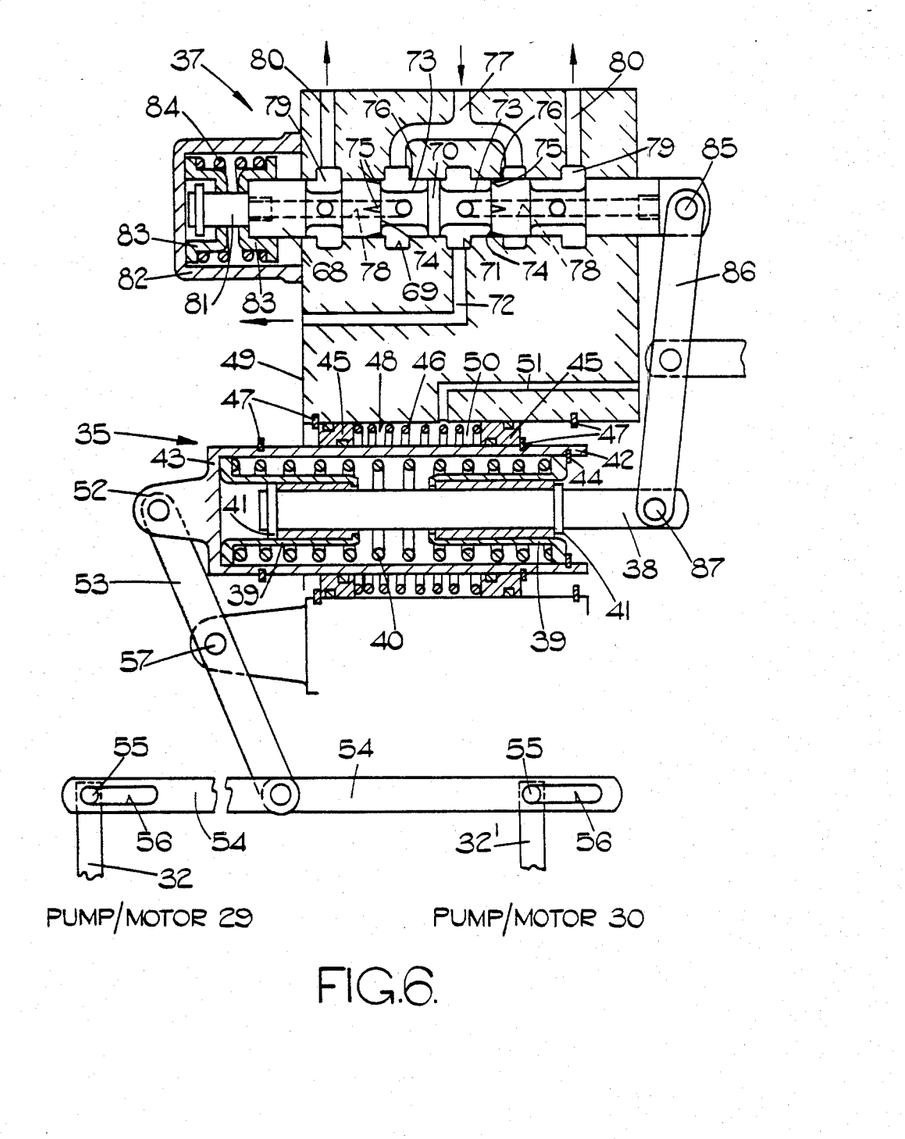
FIG. 6 is a similar view to FIG. 5 but showing the control unit in a full steering position.

A second embodiment of the invention is shown in FIGS. 4 to 6 and is generally similar to that described above with reference to FIG. 1, similar parts being accorded the same reference numerals. In this embodiment, however, the valve units 37 and the control unit 35 are combined into a single module, which is shown in detail in FIG. 5. Additionally, both valve units are now combined into a single construction, which comprises a spool 68 axially slidable within a configurated cylinder 69 formed in the block 49 of the control unit 35.

The spool 68 has at its middle a portion 70 of relatively large diameter which, when the spool 68 is in a neutral position as shown in FIG. 5, locates in an annular recess 71 in the cylinder 69. A passage 72 provides communication between the recess 71 and drain. On either side of the portion 70, the spool has an annular recess 73 which terminates at a step 74 having grooves 75 at spaced points on its periphery. Each step 74 confronts a corresponding step 76 on the cylinder 69 to define a variable constriction, in the same manner as the steps 59 and 63 in FIG. 3. The fluid source 36 (FIG. 4) for braking is connected to a bifurcated passage 77 each branch of which opens into the cylinder 69 on one side of a respective one of the variable constrictions. On the opposite side of each constriction, a respective passage 78 formed through the interior of the spool 68 opens into the appropriate recess 73. Each passage 78 also opens into a respective further recess 79 between the spool 68 and the cylinder 69, this passage being connected to a respective one of the brakes 28 by way of a passage 80.

At one end thereof, the spool 68 has an extension 81 which projects into a housing 82 provided on the block 49. Mounted in the housing 82 and surrounding the extension 81 are a pair of annular abutment members 83 having a compression spring 84 interposed therebetween. The abutment members 83 are connected to the extension 81 in such a manner that movement of the spool 68 either to the right or to the left will cause the members 83 to compress the spring 84. At its other end, the spool 68 has a pivot point 85 where it is connected to an end of a link 86, the opposite end of the link 86 being connected to the input member 38 of the control unit 35 at a pivot point 87. An operating member 88, to which the steering demand is applied, is pivotally connected to the link 86 at a location intermediate the pivot points 85 and 87.

In order to steer the vehicle to the left, the operating member 88 is moved rightward. At this time, the force exerted by the spring 84 due to its preload prevents the spool 68 from moving, with the result that the link 86 pivots with the point 85 as a fulcrum. The input member 38 of the control unit 35 is thereby moved rightward, whereupon the control device acts exactly as described previously to move the control lever 32' of the pump/motor 30 to reduce the displacement while the pump/motor 29 remains at maximum displacement.

As steering demand increases and the hydrostatic pressure at the pumps/motors 29 and 30 rises, the fluid pressure in the space 50 of the control unit 35 will oppose movement of the input member 38 sufficiently to cause the point 87 to act as a fulcrum for pivoting of the link 86. Hence, rightward movement of the operating member 88 will cause rightward movement of the spool 86, thereby increasing the constriction defined by the left-hand pair of steps 75,76 as viewed in FIG. 5. The fluid pressure in the path defined by the right-hand branch of the passage 77, the right-hand passage 78 in the spool 68, and the right-hand passage 80 thus rises because of the increased constriction between the source 36 and the drain passage 72, thereby actuating the left brake of the vehicle. At this time, the right brake remains in operative since the passage 80 to which it is connected (i.e. the left-hand passage 80 in FIG. 5) communicates freely with the drain passage 72 via the left-hand passage 78 in the spool 68. In the same manner as described with reference to FIG. 3, progressive movement of the spool 68 causes the constriction between the appropriate pair of steps 74, 76 to be progressively narrowed, thereby actuating the brake in a progressive manner with increasing steering demand.

As a further brake action is demanded with point 87 remaining as the fulcrum for the link 86, a reduction in hydrostatic pressure at the pumps/motors 29 and 30 will occur. This is because the curvature of the vehicle's turning path will be governed by the ratio of the capacities of the two pumps/motors, while the steering torque exerted at the relevant sun wheel 25 (FIG. 4) will effectively be the sum of the braking torque and the torque corresponding to the hydrostatic pressure at the pumps/motors. Such a reduction in the hydrostatic pressure will cause the point 85 to become the fulcrum for movement of the link 86 once again, and will allow the displacement of the pump/motor 30 to be reduced. When the hydrostatic pressure again rises to the point where the preload of the spring 84 can be overcome, the point 87 will return to being the fulcrum, and so on. Thus, once normal maximum hydrostatic pressure has been reached, the operating member 88 will in effect move both the input member 38 of the control unit 35 and the spool 68 of the valve 37 together in response to further steering demand, with the appropriate brake 28 being applied progressively and the hydrostatic pressure at the pumps/motors 29 and 30 remaining at its normal maximum value.

As in the previous embodiment, in the event of the hydrostatic pressure exceeding the safe maximum, the spring 40 in the control unit 35 will collapse sufficiently to reduce the pressure to a safe value.

Although the above description refers to steering of the vehicle to the left, it is to be appreciated that steering of the vehicle to the right will be performed in an exactly analagous manner, with the operating member 88 being moved leftward instead of rightward. FIG. 6 shows the control module when the operating member 88 has been moved to obtain maximum steering to the right.

In a modification of the system shown in FIGS. 4 to 6, the hydrostatic pressure at the pumps/motors 29 and 30 is fed back to the valve unit 37 in addition to the control unit 35. This can be performed by extending the ends of the spool 68, providing suitable housings to cover the ends thus extended, and making fluid connections from the passages 80 to these housings such that a force tending to centre the spool is created whenever the spool is moved in either direction from its neutral position.

In both of the embodiments described above, steering is designed to take place while the vehicle is either in motion (forwards or backwards) or stationary. The steering thus provided is sufficient for all normal vehicle requirements. However, in certain applications it may be desirable for the vehicle to be capable of executing a turn from stationary, by driving one track forwardly and the other track rearwardly at equal speeds. This can be achieved by incorporating a suitable gear train between the casing of the differential gearing 11 and the shaft 18, this gear train being clutched in while the gear wheels 14 to 17 are clutched out.

In a further embodiment, should loss of hydrostatic pressure occur for any reason in units 29 and 30, application of steer demand will cause input member 38 to abut against a mechanical stop, having travelled to maximum stroke, thus allowing the pivot point 87 to become the fulcrum for application of brakes to accomplish at least a reduced level of steering until the fault can be traced and rectified. On the other hand should loss of brake pressure occur for any reason then hydrostatic steering is still available from units 29 and 30. Thus a measure of fail-safe protection is built into the system.

Furthermore, the linkage is arranged so that whenever the driver's steering control is in its maximum steer demand position, the appropriate steering brake valve delivers full pressure to the appropriate brake to ensure that it is totally arrested regardless of the hydrostatic transmission pressure.

Figure 7:
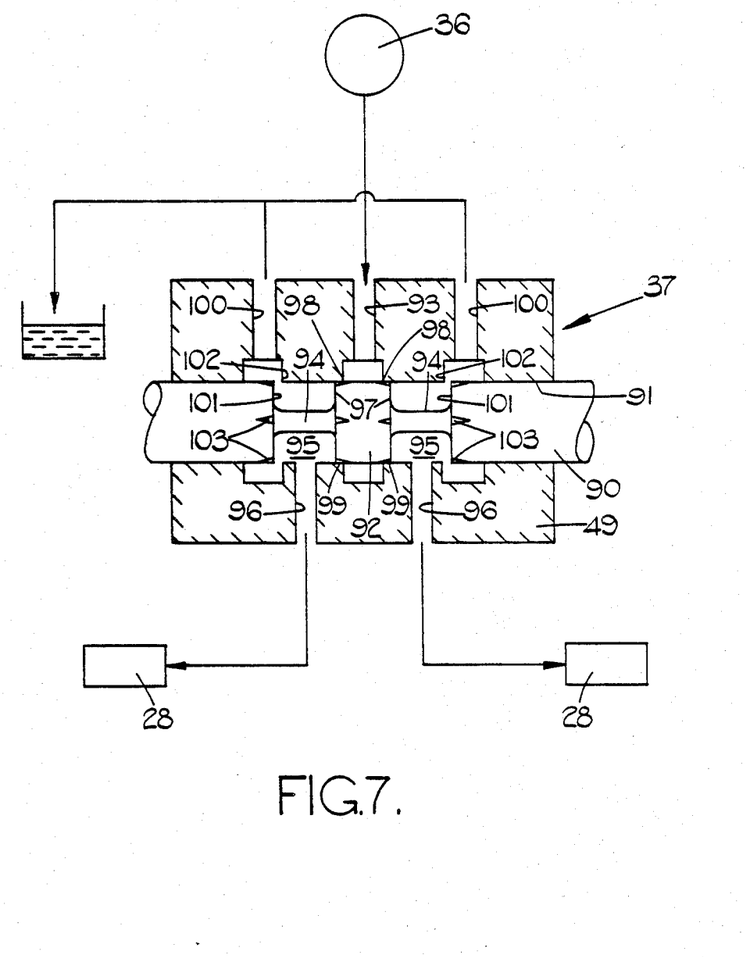
FIG. 7 is a sectional view of a modified valve unit which can be used in the control unit shown in FIG. 5.

In the embodiment of FIGS. 4 to 6, the valve unit 37 is of the open centre type: however, this unit may equally well be of the closed centre type, as depicted in FIG. 7. The closed centre valve unit comprises a spool 90 which is axially slidable within a configurated cyliner 91, the cylinder being formed in the block 49 of the control unit 35, as before. The spool 90 has at its middle a portion 92 of relatively large diameter which, when the spool occupies the neutral position illustrated, obstructs a passage 93 to which the source 36 of pressurised fluid is connected. Flanking the portion 92, the spool 90 has respective portions 94 of relatively small diameter which co-operate with the cylinder 91 to define annular spaces 95 with which respective passages 96 communicate, each of these passages being connected to a respective one of the brakes 28. A shoulder 97 between each portion 94 and the portion 92 co-operates with a corresponding shoulder 98 on the cylinder 91 to define a variable constriction between the passage 93 and a respective one of the passages 96, the shoulder 97 being provided with grooves or notches 99 at spaced locations around its periphery.

A further variable constriction is provided between each passage 96 and a respective further passage 100 which is connected to drain, the constriction being defined between a shoulder 101 on the spool 90 and a corresponding shoulder 102 on the cylinder 91. Like the shoulders 97, each shoulder 101 is provided with grooves or notches 103 at spaced intervals around its periphery.

In the neutral position of the spool 90, the source 36 of pressurised fluid is isolated by the middle portion 92, and both brakes 28 are open to drain via the respective passage 96, annular space 95 and passage 100. When the vehicle is steered to the left in the manner described previously, upon increasing steering demand the spool 90 will be moved from its neutral position to the right as viewed in the drawing. This will cause the constriction between the left-hand shoulders 97 and 98 to open progressively and the constriction between the left-hand shoulders 101 and 102 to close progressively, thereby opening communication between the left-hand brake 28 and the source 36 while at the same time closing communication between that brake and drain. At the same time, the right-hand brake 28 will remain in communication with drain via the constriction between the right-hand 101 and 102. Thus, the left-hand brake will be progressively actuated as the spool 90 moves further to the right.

During steering of the vehicle to the right, the valve unit 37 will operate in an exactly analogous manner to actuate the right-hand brake 28, the spool 90 in this case being moved to the left.

Although not shown, the valve unit 37 will be provided with spring means to oppose movement of the spool 90 in either direction from its neutral position. Moreover, provision can be made for brake cylinder pressure to be fed to suitable areas at the ends of the spool to give the valve unit a suitable operational "feel".

From the above description, it will be manifest that the use of a closed centre valve requires no flow from the source 36 until the pressure in the hydrostatic transmission reaches a predetermined level, in the manner explained previously. To this end, the source 36 can comprise an hydraulic pump and an accumulator, with a valve being provided automatically to unload the pump when the pressure of the fluid in the accumulator reaches a preset level.

The principle of utilising a closed centre valve can of course equally well be applied to the embodiment shown in FIGS. 1 to 3, wherein a separate valve unit is provided for each brake.

The vehicle steering systems described above have the following significant advantages:

(1) As mentioned previously, the braking action is achieved in a progressive manner which avoids the instabilities experienced with previous systems of this type.

(2) The fluid source for the brakes is independent of the hydrostatic system which operates the pumps/motors 29 and 30, and accordingly it is not necessary to provide reversing valves to cater for the vehicle being driven backwards.

(3) In the case of the systems shown in FIGS. 4 to 7, only one valve unit is required to operate both brakes.

(4) The pumps/motors 29 and 30 are not interlocked for inverse operation, which means that both pumps/motors can be operated at maximum displacement for straight ahead driving of the vehicle.

(5) Should loss of pressure occur in the pump/motor 29 and/or in the pump/motor 30, emergency steering is available by means of the brakes 28. Conversely, if the brakes should fail, then emergency steering is available through the hydrostatic units.

We claim:

1. A system for steering a vehicle in response to a steering demand, said vehicle having on opposite sides thereof motive units selected from tracks and sets of wheels, said system comprising:
   (a) a differential drive means for driving said motive units, said differential drive including a hydrostatic transmission operatively connected to said motive units and having a hydrostatic pressure;
   (b) control means, operative in response to said steering demand, for driving said hydrostatic transmission to drive said motive units on opposite sides of said vehicle at different relative speeds and for producing a steering action on said vehicle; and
   (c) brake means, operative in response to said hyudrostatic pressure exceeding a predetermined level, for applying a braking effect to an appropriate one of said motive units and for supplementing said steering action, said braking effect being increased progressively with increases in said steering demand.

2. The system according to claim 1, wherein said control means includes:
   (a) an input member which is moved in accordance with said steering demand;
   (b) an output member which is movable to vary the relative speeds of said motive units;
   (c) means operative to move the output member in response to movement of said input member;
   (d) spring means, operatively interconnecting said input and output members and having a pre-load, for urging said input and output members into a desired position; and
   (e) override means which applies to said output member in opposition to said spring means a force which is dependent upon said hydrostatic pressure, said pre-load of said spring means being set so as to be overcome by said override means in the event that said hydrostatic pressure exceeds a predetermined maximum safe level.

3. The system according to claim 1, wherein said hydrostatic transmission includes a pair of variable displacement hydrostatic pump/motor units each of which is operatively coupled to a respective one of said motive units, and wherein said control means further includes means, operative in response to said steering demand, for altering said displacement of an appropriate one of said pump/motor units while maintaining said displacement of the other pump/motor unit substantially constant.

4. The system according to claim 3, wherein each said pump/motor unit has a control member which is movable to vary said displacement, and wherein said control means includes a linkage which interconnects said control members and means operative to move said linkage in response to said steering demand, said linkage occupying a neutral position when said steering demand is absent and being moved in one or an opposite direction when said steering demand is present, thereby to alter said displacement of said appropriate one of said pump/motor units.

5. The system according to claim 4, wherein a respective pin-and-slot connection couples said linkage to each said control member.

6. The system according to claim 1, wherein said brake means includes a source of pressurised fluid which is independent of said hydrostatic transmission, a pair of brakes associated with said motive units respectively and actuable by pressurised fluid from said source, and valve means operatively connected between said brakes and said source, said valve means being operative to control the pressure of fluid supplied to said brakes from said source, said pressure supplied to an appropriate one of said brakes being increased in response to an increase in said steering demand.

7. The system according to claim 6, wherein said valve means controls said pressure of fluid supplied to said brakes in response to said hydrostatic pressure.

8. The system according to claim 6, wherein said control means includes an input member which is moved in accordance with said steering demand, and means operative to apply to said input member a force which opposes said movement thereof to a degree dependent upon said hydrostatic pressure, and wherein said valve means includes a valve member which is movable in one or an opposite direction from a neutral position to increase the fluid pressure applied to one or the other of said brakes respectively, said valve member of said valve means and said input member of said control means both being pivotally attached to a link to which said steering demand is applied.

9. The system according to claim 8, wherein said valve member is pivotally connected to said link at a first pivot point, said input member is pivotally connected to said link at a second pivot point spaced from said first pivot point, and said steering demand is applied to said link by way of an operating member which is pivotally connected to said link at a third pivot point disposed between said first and second pivot points.

10. The system according to claim 6, wherein said valve means includes a cylinder, a valve member which is axially movable within said cylinder, a pair of constrictions defined between said cylinder and said valve member, movement of said valve member in one direction causing the size of one of said constrictions to be reduced and in an opposite direction causing the size of the other said constriction to be reduced, each said constriction being disposed in a respective fluid line between said source and a drain, and each said brake being connected to a respective one of said fluid lines at a point between said source and said constriction.

11. The system according to claim 10, wherein each said constriction is defined between a respective first shoulder on said valve member and a respective second shoulder on said cylinder, one of said first and second shoulders being grooved at spaced points therein.

12. The system according to claim 6, wherein said valve means includes a cylinder, a valve member which is axially movable within said cylinder, a pair of first constrictions defined between said cylinder and said valve member, each said first constriction being disposed in a respective fluid path between said source and a respective one of said brakes, and a pair of second constrictions defined between said cylinder and said valve member, each said second constriction being disposed between a respective one of said brakes and a drain, movement of said valve member in one direction causing the size of one of said first constrictions associated with one of said brakes to be increased and also causing the size of a respective one of said second constrictions also associated with said one of said brakes to be decreased, movement of said valve member in an opposite direction causing the size of the other of said first constrictions to be increased and the size of the other of said second constrictions to be decreased.

13. The system according to claim 12, wherein each of said first and second constrictions is defined between a respective first shoulder on said valve member and a respective second shoulder on said cylinder, one of said first and second shoulders being notched at spaced points therein.

14. The system according to claim 6, wherein said hydrostatic transmission includes a pair of hydrostatic pump/motor units each of which is operatively coupled to a respective one of said motive units and hydrostatic lines which interconnect said pump/motor units in such a manner as to form a closed hydraulic circuit, and wherein said valve means comprises a pair of valves, one for each said brake, each of which is responsive to hydrostatic pressure in a respective one of said hydrostatic lines to control the pressure of fluid supplied to the respective one of said brakes.

15. The system according to claim 14, wherein each said valve includes a cylinder, a valve member axially movable within said cylinder, a constriction defined between said cylinder and said valve member, the size of said constriction being varied by movement of said valve member relative to said cylinder, and means operative to move said valve member so as to change the size of said constriction in response to an increase in said hydrostatic pressure.

16. The system according to claim 15, wherein said constriction is defined between a first shoulder on said cylinder and a second shoulder on said valve member, one of said first and second shoulders being notched at spaced points therein.

17. The system according to claim 15, wherein said means operative to move said valve member so as to reduce the size of said constriction comprises a fluid pressure which is dependent upon said hydrostatic pressure, and wherein a spring acts upon said valve member in opposition to said fluid pressure, said spring having a pre-load which is set so as to be overcome by said fluid pressure when said hydrostatic pressure exceeds said predetermined level.

* * * * *